(12) United States Patent
Fulkerson et al.

(10) Patent No.: US 6,603,614 B2
(45) Date of Patent: Aug. 5, 2003

(54) LENS ASSEMBLY HAVING AUTOMATIC THERMAL FOCUS ADJUSTMENT

(75) Inventors: E. Greg Fulkerson, Amelia, OH (US); Mike Larson, Georgetown, OH (US)

(73) Assignee: Corning Precision Lens, Inc., Cincinnati, OH (US)

( * ) Notice: Subject to any disclaimer, the term of this patent is extended or adjusted under 35 U.S.C. 154(b) by 0 days.

(21) Appl. No.: 09/996,756

(22) Filed: Nov. 29, 2001

(65) Prior Publication Data

US 2002/0101668 A1 Aug. 1, 2002

Related U.S. Application Data

(60) Provisional application No. 60/264,483, filed on Jan. 26, 2001.

(51) Int. Cl.[7] .................................................. G02B 7/02
(52) U.S. Cl. ........................ 359/820; 359/819; 359/821; 359/811
(58) Field of Search ................................. 359/820, 819, 359/821, 811, 649, 713, 650, 651, 756

(56) References Cited

U.S. PATENT DOCUMENTS

| | | | |
|---|---|---|---|
| 4,557,567 A | 12/1985 | Azumi et al. ................ 359/683 |
| 5,272,540 A | 12/1993 | Hirata et al. ................ 358/237 |
| 5,276,555 A | 1/1994 | Sansbury .................... 359/826 |
| 5,608,579 A | 3/1997 | Nomura ...................... 359/820 |
| 5,946,142 A | 8/1999 | Hirata et al. ................ 359/649 |
| 6,046,860 A | 4/2000 | Hirata et al. ................ 359/649 |
| 6,104,554 A | 8/2000 | Bodurek, Jr. et al. ....... 359/820 |
| 6,299,313 B1 * | 10/2001 | Hirata et al. .................. 353/54 |
| 6,351,483 B1 * | 2/2002 | Chen .......................... 372/101 |
| 2002/0011520 A1 * | 1/2002 | Gurevich et al. ....... 235/462.21 |

OTHER PUBLICATIONS

Corning Precision Lens, Lens Assembly Drawing, May, 1995.

* cited by examiner

*Primary Examiner*—Jordan M. Schwartz
*Assistant Examiner*—Tim Thompson
(74) *Attorney, Agent, or Firm*—Wood, Herron & Evans, L.L.P.

(57) ABSTRACT

A lens assembly especially adapted for mounting in an environment subject to variable temperatures, such as a projection television set, including an automatic thermal focus adjustment. A lens mount is formed from a material having a first coefficient of thermal expansion and carries at least one lens. A focus mount is coupled to the lens mount and is formed from a material having a second coefficient of thermal expansion different from the first coefficient of thermal expansion. Adjustment and locking structure couples the lens mount to the focus mount and allows the lens mount to be axially adjusted relative to the focus mount and then locked in position. In use, the relative axial positions of the lens mount and focus mount automatically change to move the lens in response to a temperature change in the environment of use and after being locked in position with the adjustment and locking structure.

32 Claims, 4 Drawing Sheets

LENS ASSEMBLY HAVING AUTOMATIC THERMAL FOCUS ADJUSTMENT

This application claims the benefit under 35 U.S.C. §120 of Provisional Application Ser. No. 60/264,483, filed Jan. 26, 2001 and currently pending. The disclosure of that provisional application is hereby fully incorporated by reference herein.

FIELD OF THE INVENTION

The present invention generally relates to optical lens assemblies and, more particularly, to lens assemblies used in projection televisions and other optical lens assemblies used in environments which are subject to variable temperatures.

BACKGROUND OF THE INVENTION

A projection television set typically includes three cathode ray tubes (CRTs), corresponding to the primary colors, red, blue and green. A projection lens assembly uses a plurality lens to magnify the image appearing on the CRT faceplate and project that image onto a much larger viewing screen. CRTs used in projection televisions typically have a diameter of 3 to 9 inches. The image projected onto the screen generally has a size ranging from 40 to 60 inches or larger measured diagonally.

Each of the CRTs must provide maximum brightness or light intensity and, to facilitate this objective, each CRT operates at maximum power to produce maximum light output at the faceplate while still maintaining color balance. As a result, the CRTs generate considerable heat within the enclosure of the projection television set. It is not uncommon for portions of the projection television lens assemblies to be elevated by 40° C. to 45° C. or more above room temperature.

Each CRT has an associated magnifying lens system mounted adjacent to the CRT faceplate. Usually, the lens assembly is formed with at least one "A" lens element, at least one "B" lens element and at least one "C" lens element. Regardless of the number of lens elements, these are generally referred to in the art as "A", "B" and "C" lens groups. That is, each "group" may be comprised of one or more lens elements. The "B" lens group usually includes a lens formed of glass, while the "A" and "C" lens groups may be formed of plastic. However, it should be understood that each group may comprise one or more lenses formed of glass and one or more lenses formed of plastic. Alternatively, the lens assemblies may comprise all glass lenses or all plastic lenses. Due to the heat generated by the CRTs, the plastic lenses will distort or otherwise undergo changes in optical properties. This is particularly true of the "C" lens which is mounted closest to the associated CRT. Also, the refractive index of liquid such as ethylene glycol used to cool the lens assemblies will also change due to temperature changes. Due to the temperature induced optical property changes such as these, the focus of the lens system can change. More specifically, as the temperature of the lens assembly changes over several hours of continuous operation, the picture displayed on the television screen could become blurred as a result of the defocusing effect of the increased temperature. This blurring effect can be more noticeable on high definition television (HDTV) sets due to their higher resolution capability.

Some temperature correction systems rely on one or more temperature sensors within a projection television cabinet and an automatic focusing mechanism which refocuses the lens assemblies based on feedback from the temperature sensor(s). Drawbacks to such systems include the expense and the relative difficulty in ensuring that each lens assembly is corrected in an effective and independent manner. One simpler manner of addressing the problems of heat-induced lens distortion is described in U.S. Pat. No. 6,104,554, assigned to the assignee of the present invention, and the disclosure of which is hereby fully incorporated by reference herein. The preferred embodiment shown and described in U.S. Pat. No. 6,104,554 utilizes a plurality of bars which thermally expand as the lens assembly is heated by the associated CRT. The bars are mechanically coupled to a lens cell carrying the "A" and "B" lens elements. A "C" lens element is positioned closely adjacent to the CRT and distorts away from the "A" and "B" lens elements. The bars undergo a similar heat induced distortion or expansion and thereby move the "A" and "B" lens elements correspondingly in a direction toward the "C" element. This maintains proper lens spacing between the "A" and "B" elements and the "C" element as the temperature in the interior of the television set increases. Likewise, when the television set cools down, the "C" element and the bars will return or retract to their original positions to maintain proper focus when the television set is turned on again.

It will be appreciated that such temperature induced defocussing can occur in various embodiments, including those which are subject to variations in temperature in either direction. Despite the improvements made in this area, there is a continuing need for lens assemblies which address the effect of temperature induced focusing problems while, for example, reducing the cost and complexity associated with manufacturing the lens assemblies.

SUMMARY OF THE INVENTION

Generally, the present invention provides a lens assembly adapted to be mounted in an environment subject to temperature change and providing for at least partial focus correction through an automatic relative movement of a direct or indirect lens mounting component by thermal expansion. A lens mount carries at least one lens and is coupled to a focus mount. Adjustment and locking structure is provided for allowing the lens mount to be axially adjusted relative to the focus mount and then locked into position. The lens mount and focus mount are formed of materials having different coefficients of thermal expansion (CTEs). Depending on the application, the material forming the focus mount can have a CTE which is lower than the CTE of the material forming the lens mount or, in other applications, the reverse situation may apply. In each case, when the lens mount and focus mount are subject to a temperature change, for example, when heated by a light source or when subjected to temperature change by some other environmental condition, the axial position of the lens mount will automatically change relative to the focus mount to move the lens axially after the two mounts are locked in position with the adjustment and locking structure. The automatic axial movement may be toward another lens or optical element or away from another lens or optical element depending on the application requirements. Automatic corrective movement will also take place through contraction in an environment that relatively changes from a heated state to a cooled state.

More specifically relative to the projection television industry, in a first embodiment "A" and "B" lens elements are carried by the lens mount and are axially adjusted and then mechanically fixed relative to a "C" lens element. At elevated temperatures, the lens mount will expand at a higher rate than the focus mount to move at least the "A"

lens element toward the "C" element. This ensures that the proper lens spacing is maintained, as set during the initial adjustment, as the optical properties of the "C" element change in the heated environment.

In this embodiment, the focus mount and lens mount are cylindrical members and a mechanical fastener assembly is provided between these two members to allow the focus mount to be rotationally and axially adjusted relative to the focus mount. Once this manual adjustment is made, the focus mount is fixed relative to the lens mount and, in use, the automatic adjustment provided by the different CTEs of the two mounts takes over and automatically compensates for heat induced changes in optical properties. The manual adjustment is provided by a slot and threaded fastener assembly located approximately midway along the length of the focus mount and lens mount assembly. When fixed, this fastener assembly therefore provides a location from which the lens mount expands in opposite directions. The greatest expansion takes place toward the CRT since the temperature is highest in this region. Thus, at least the "B" lens group is mounted in the region of the lens mount positioned between the fastener assembly and the "C" element and CRT. Alternatively, both the "A" and "B" lens groups may be positioned in this region such that they move essentially in unison toward the "C" lens group.

The preferred material for the focus mount in the first embodiment is a 10% glass filled polycarbonate having a coefficient of thermal expansion of $3.22 \times 10^{-5}$ cm/cm/C. The preferred material for the lens mount is unfilled polycarbonate having a coefficient of thermal expansion of $6.75 \times 10^{-5}$ cm/cm/C. It will, however, be understood that other materials having different CTEs may be substituted while still falling within the spirit and scope of this invention. For example, although two plastic materials are used in this embodiment, metals may be substituted for one or both of these materials while achieving similar results.

In a second embodiment, the lens mount is formed of aluminum, while the focus mount is formed of plastic. In this embodiment the automatic corrective movement causes the lens or lenses carried by the lens mount to be moved away from another light transmissive or light generating component.

Additional objectives, advantages and features of the invention will become more readily apparent to those of ordinary skill in the art upon review of the following detailed description of the preferred embodiments, taken in conjunction with the accompanying drawings.

DETAILED DESCRIPTION OF THE PREFERRED EMBODIMENTS

Figure 1:
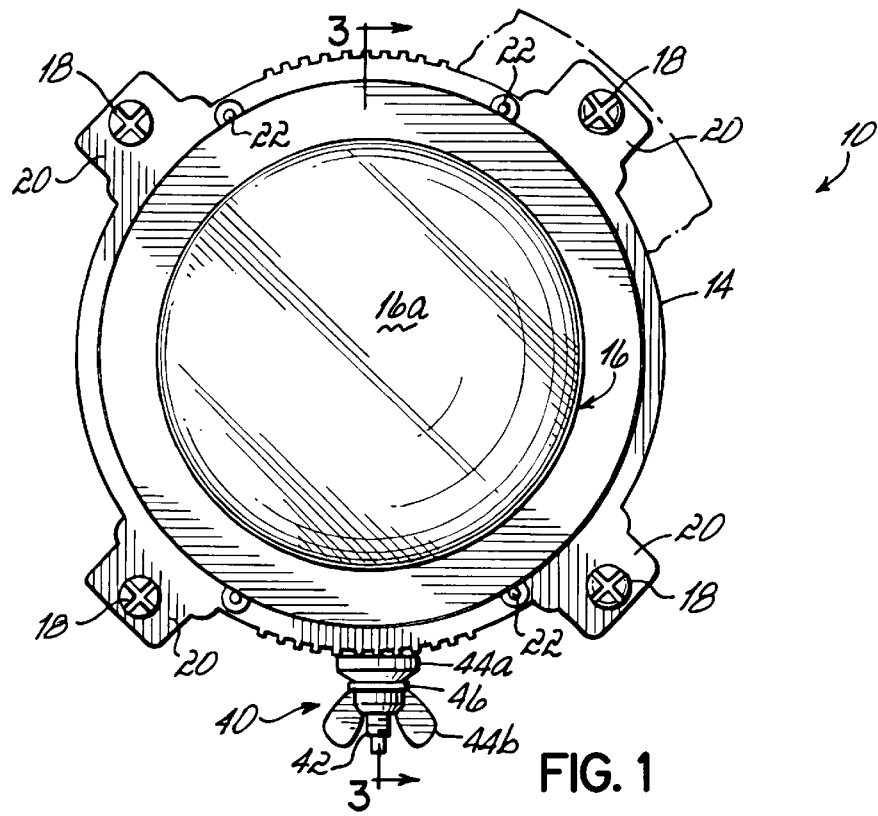
FIG. 1 is a review view in elevation showing a lens assembly constructed in accordance with the preferred embodiment.
Figure 2:
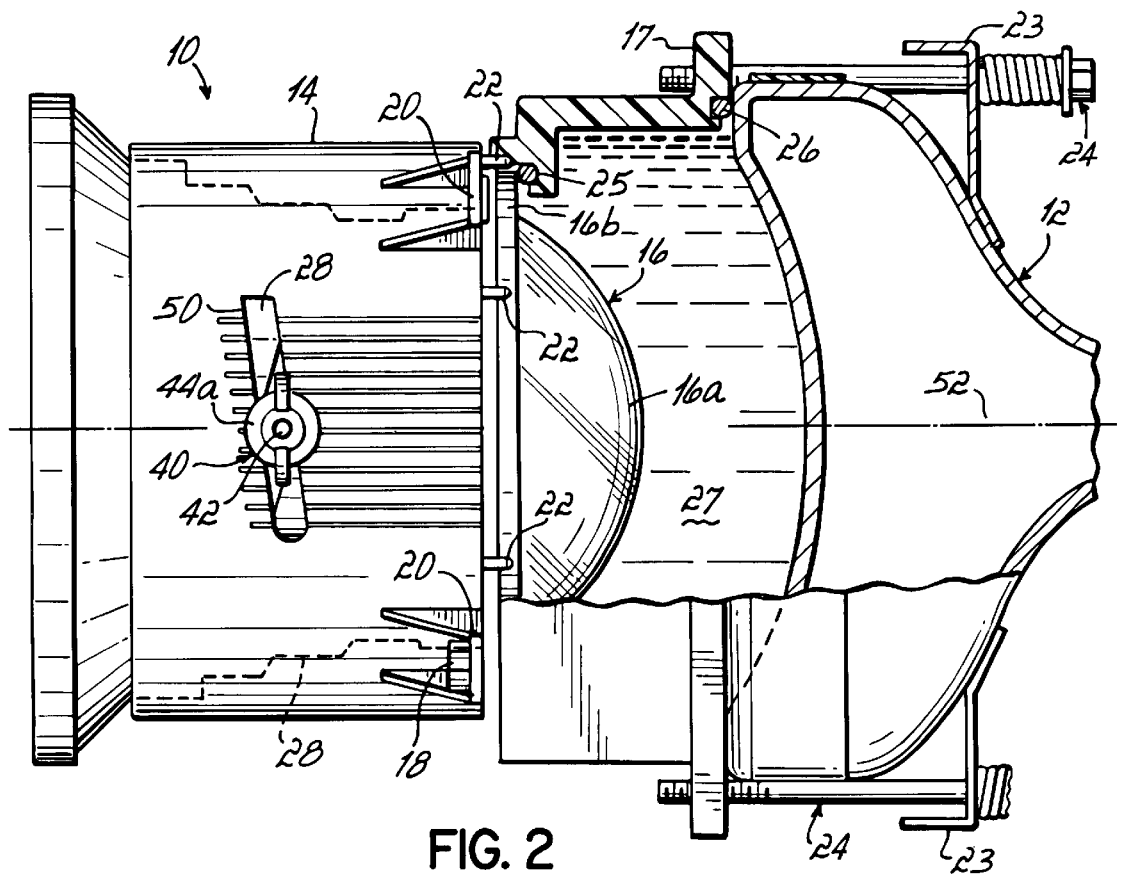
FIG. 2 is a side elevational view of the lens and CRT assembly.

Referring generally to FIGS. 1 and 2, lens assembly 10 is constructed in accordance with a preferred embodiment and use of the invention in a projection television, although it will be understood that many other configurations and uses may be utilized within the spirit and scope of the invention. The lens assembly 10 is specifically suitable for use in projection televisions sets having at least one light source that generates heat. For example, many projection televisions use a CRT 12 for each of the primary colors red, green or blue. One of the advantages of the present invention over those, for example, that use temperature sensors in the television cabinet is that each CRT 12 will be thermally controlled in a more independent manner. This can be helpful because each CRT 12 tends to operate at a different temperature and therefore may need a different amount of correction. Temperature sensor based systems may only use an average temperature within the cabinet and, therefore, may overcorrect or undercorrect one or more of the lens assemblies.

The lens assembly 10 includes an outer, generally cylindrical focus mount 14. The lens assembly includes a "C" lens element 16 referred to in the art as a field flattener lens. The focus mount 14 is mounted within the interior of the television set (not shown) through the use of a mounting member or coupler 17 and is secured to the coupler 17 by suitable fasteners 18 and flange elements 20. The field flattener lens or "C" element 16 is fixed between the focus mount 14 and the coupler 17 and is located in a centered position by pins 22. The "C" lens element 16 is formed from a clear plastic as is conventional in the art and has a convex surface 16a facing the CRT 12.

As further shown in FIG. 2, the CRT 12 is mounted against coupler 17 by a bracket 23 and spring-loaded fastener assemblies 24. O-rings 25, 26 are respectively positioned between a flange portion 16b of "C" element 16 and the coupler 17 and between the CRT 12 and the coupler 17. This forms a space 27 between the "C" element 16 and the CRT 12 for receiving a liquid coolant as is conventional. This coolant will also generally undergo a change in its refractive index when subjected to a temperature change. The present invention corrects for this type of defocussing effect as well.

Figure 4:
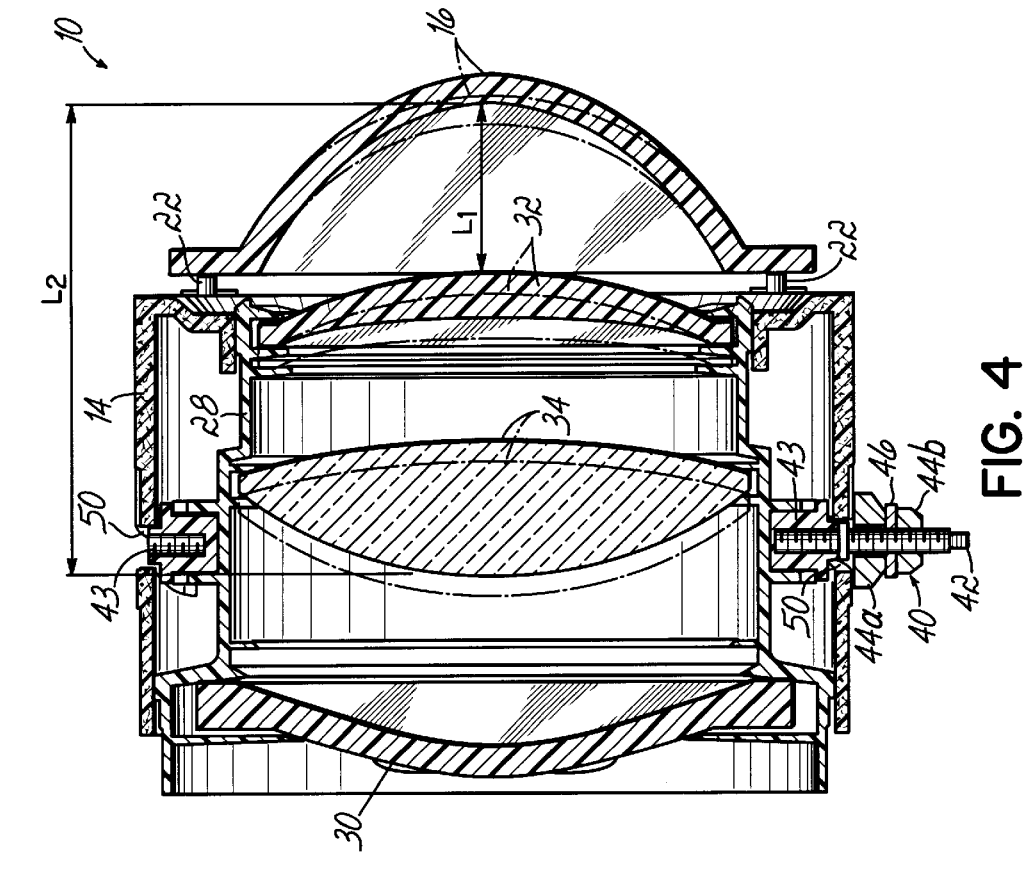
FIG. 4 is a cross sectional view similar to FIG. 3, but illustrating the lens assembly automatically corrected under the effect of heat induced distortion.
Figure 3:
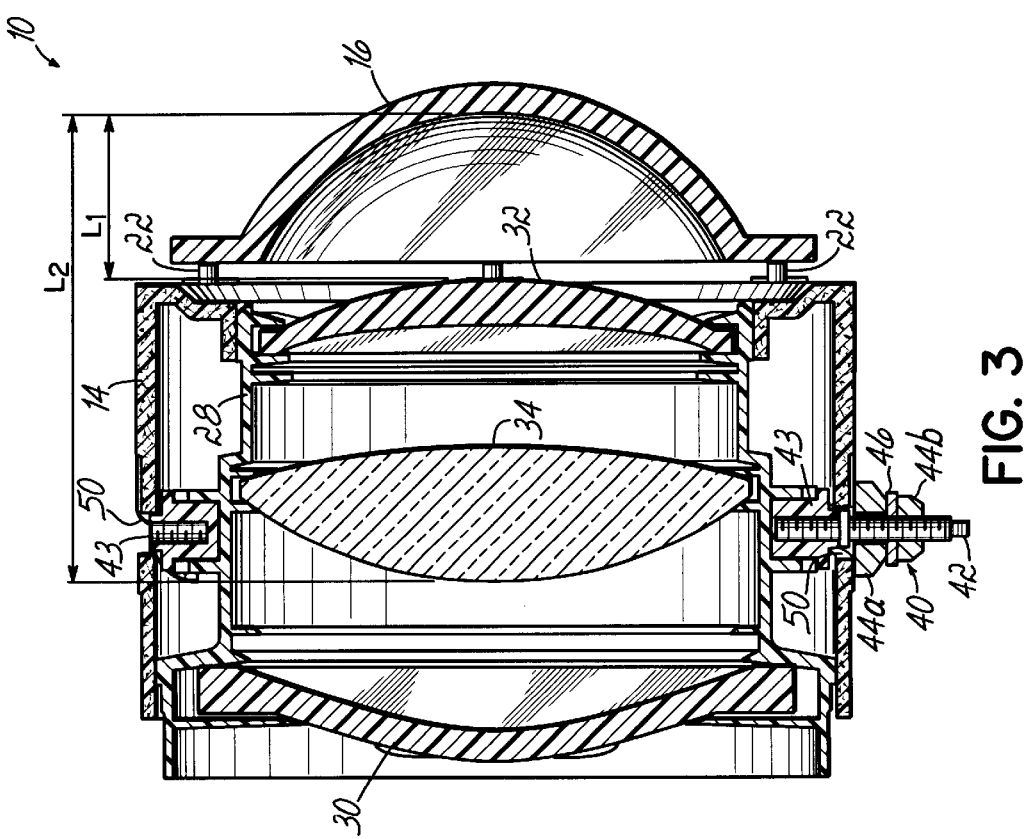
FIG. 3 is a cross sectional view taken along line 3—3 of FIG. 1.

Referring to FIGS. 3 and 4, a lens mount 28 carries three lenses including an "A" element 30 and a pair of "B" elements 32, 34. The "B" element 32 which is closest to the "C" element 16 is formed from clear plastic as is the "A" element 30. The larger, centrally located "B" element 34 is formed from glass and provides the majority of the positive magnifying power to the lens assembly 10. Referring back to FIG. 2, it will be appreciated that the CRT 12 directs light initially through the "C" lens element 16 and then through the respective "B" elements 32, 34 and finally the "A" element 30 before the light and resulting image is received by the television screen (not shown) positioned on a side of the lens assembly 10 opposite to the CRT 12.

The lens mount 28, including the "A" and "B" lens elements 30, 32, 34 may be manually adjusted in an axial manner in left and right directions as viewed in FIGS. 3 and 4 relative to the "C" lens element 16. This is an initial adjustment typically made at the factory during the manufacturing process. To facilitate this adjustment, a fastener assembly 40 comprising an externally threaded fastener 42 received in an internally threaded insert 43 and further received in a nut assembly 44a, 44b with a lock washer 46 therebetween extends through a slot 50 in the focus mount 14. An upper insert 43 does not receive any fastener, but simply acts as a guide member during rotational adjustment. The nut assembly 44a, 44b is loosened allowing the focus mount 14 to rotate relative to the lens mount 28. As shown in FIG. 2, the slot 50 extends at a nonperpendicular angle relative to the axis 52 (FIG. 2) of the lens assembly 10. Therefore, as the focus mount 14 is rotated, the fastener insert 43 moves along the axis 52 and thereby moves the lens mount 28 and lenses 30, 32, 34 along the axis 52 either toward or away from the CRT 12 depending on the direction of rotation. Once the proper focus has been set in this manner, the nut assembly 44a, 44b is tightened and the distance between the respective "A" and "B" lenses 30, 32, 34 relative to the "C" lens 16 is fixed.

As further shown in FIG. 4, after the television set has been in use for a continuous period of time, heat from the CRT 12 will cause the "C" lens element 16 to distort from the position shown in dash-dot lines to the position shown, in exaggerated form, in solid lines. That is, the "C" lens element 16 will deform or distort in a direction toward the CRT 12. Thus, if the "B" lens elements 32, 34 remained in the position shown in FIG. 3, the respective distances $L_1$, $L_2$ between the "B" lens elements 32, 34 and the "C" lens element 16 would be different than the distances initially set through the use of fastener assembly 40 to obtain proper focus. The projected image on the screen may therefore become blurred. To compensate for the effects of heat induced distortion or other optical property changes of the "C" lens element 16, the lens mount 28 is formed from a material having a different coefficient of thermal expansion (CTE) than the focus mount 14. In particular, the portion of the lens mount 28 holding the "B" lens elements 32, 34 moves to the right as shown in FIG. 4 so that the $L_1$ and $L_2$ distances are maintained as consistent as possible with those originally set as shown in FIG. 3. Thus, the portion of the lens mount 28 to the right of fastener assembly 40, as shown in FIG. 4, thermally expands and moves to the right and carries lens elements 32, 34 from the positions shown in dash-dot lines to the positions shown in solid lines. In the preferred embodiment, the lens mount 28 is formed from a plastic material having a CTE of $6.75 \times 10^{-5}$ cm/cm/C, while the focus mount has a lower CTE of $3.22 \times 10^{-5}$ cm/cm/C. Most preferably, the focus mount 14 is formed from a 10% glass filled polycarbonate, while the lens mount 28 is formed from unfilled polycarbonate. The refocusing distance ranges from around 0.10 mm to about 0.15 mm for the projection television lens assembly 10 shown assuming a temperature in the region of the "C" lens element 16 of about 60° C.–65° C. when the television set has been in continuous operation.

Figure 5A:
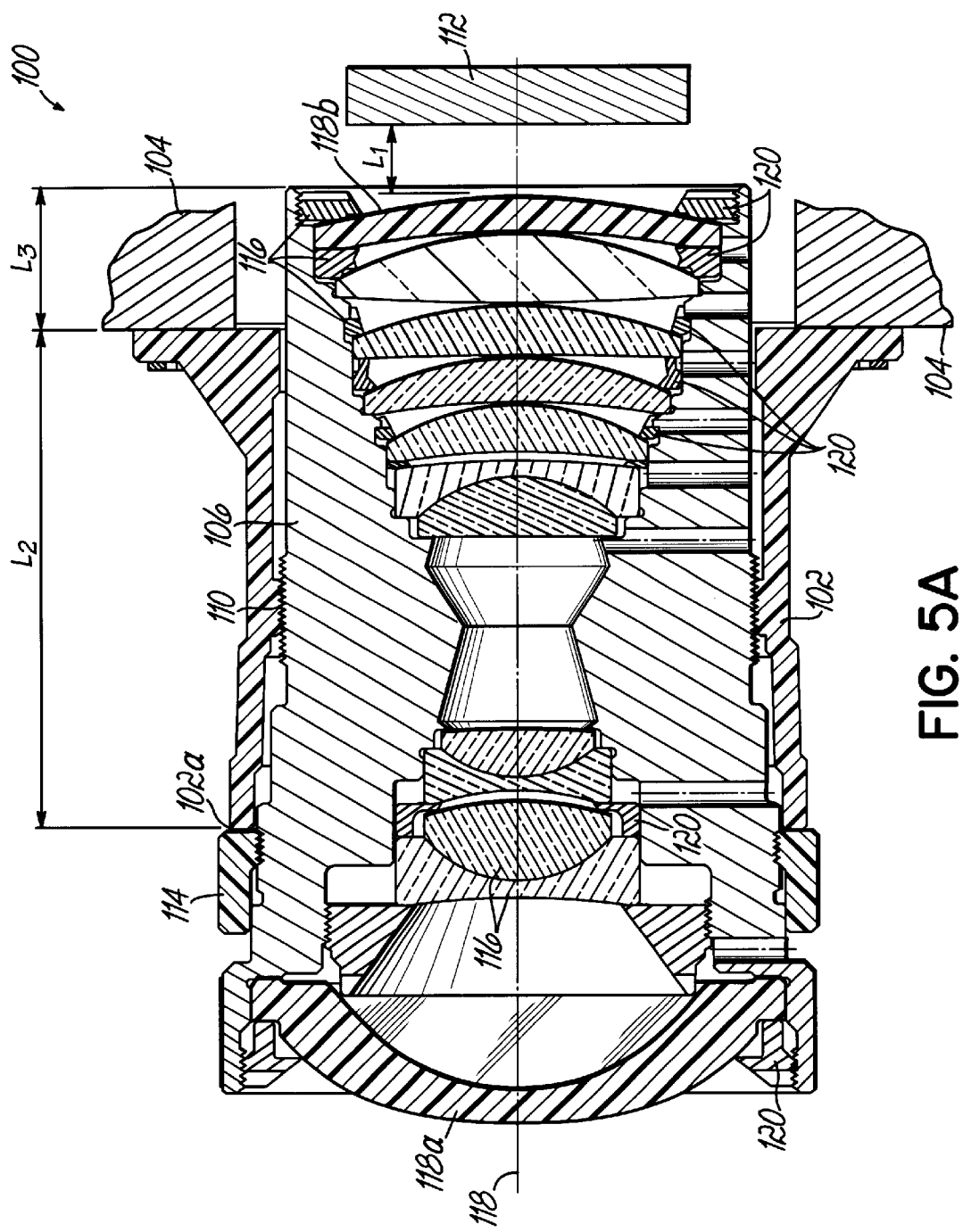
FIG. 5A is a longitudinal axial cross section of an alternative lens assembly constructed in accordance with the invention.
Figure 5B:
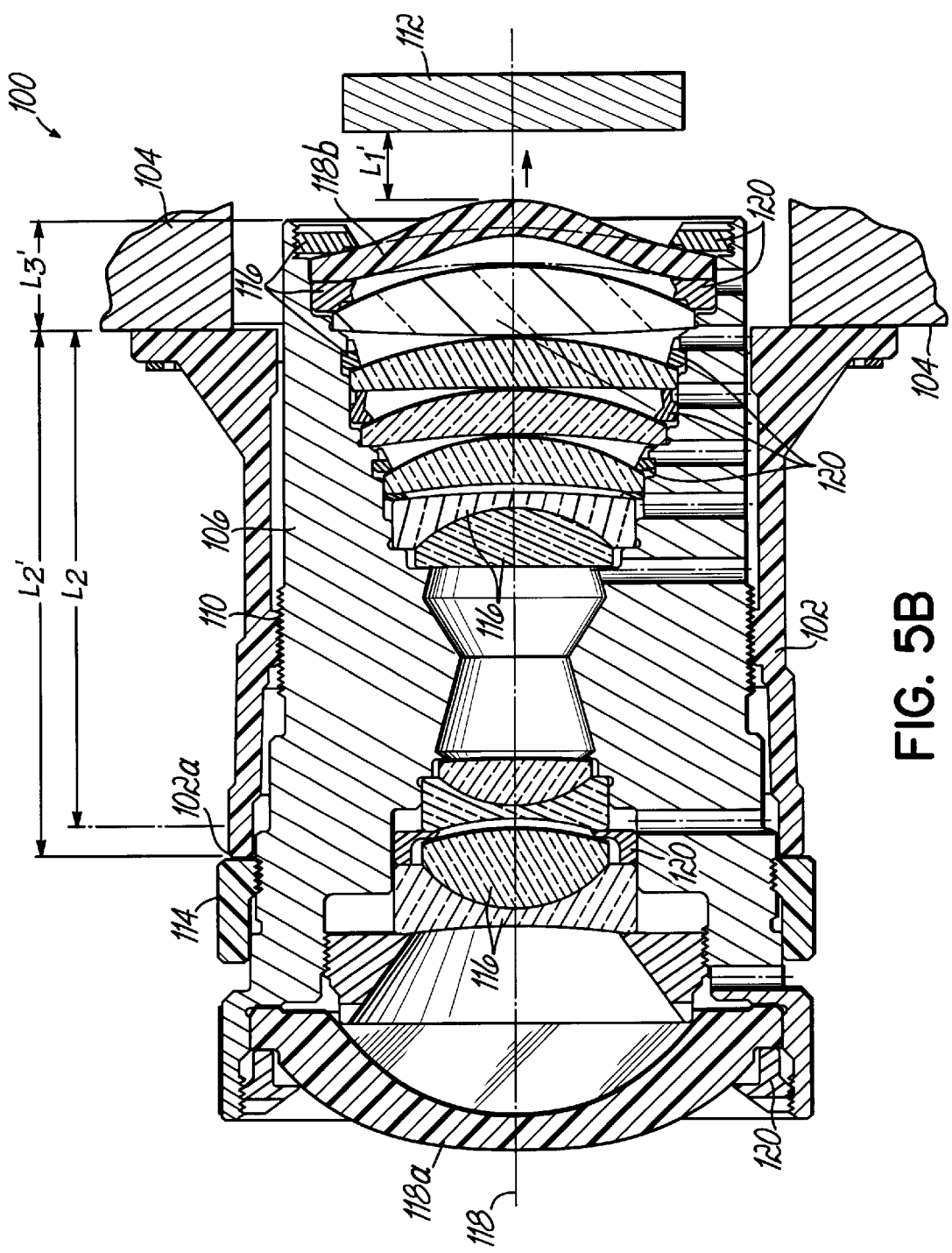
FIG. 5B is a cross sectional view similar to FIG. 5A, but illustrating the lens assembly automatically corrected under the effect of heat induced distortion.

FIGS. 5A and 5B illustrate one of many possible alternative embodiments of the invention in the form of a lens assembly 100. Lens assembly 100 includes an outer focus mount 102 rigidly affixed to a suitable support structure 104 and an inner lens mount 106. Focus mount 102 and lens mount 106 are each preferably cylindrical, but more generally tubular in shape, and extend along a longitudinal axis 108. Lens mount 106 is received within focus mount 102 and is secured thereto by threads 110 which allow adjustment between the relative axial positions of focus mount 102 and lens mount 106. This moves lens mount 106 toward and away from a light emitting, or generating component such as a prism assembly 112 schematically shown in FIGS. 5A and 5B. The initial focus position of lens mount 106 is locked into place using a locking ring 114 which bears against an end 102a of focus mount 102 and threads onto lens mount 106. A series of lens elements 116, 118a, 118b are secured within lens mount 106 and are designed and configured to achieve any desired light or image transmission purpose. The configuration, design construction material, and number of lens elements 116, 118a, 118b shown therefore are not to be taken in any limiting sense. An outer "A" lens element 118a and an outer "B" lens element 118b may be formed of a plastic material, such as acrylic. The remaining "A" and "B" lens elements 116 may be formed from glass. Suitable retaining elements 120 are used to secure the "A" and "B" lens elements 116, 118a, 118b in place within lens mount 106. This lens assembly 100, like the first embodiment, is illustrative only and may be changed in terms of configuration and materials of construction according to the needs of a particular application.

FIG. 5A illustrates the unheated state of lens assembly and respective distances $L_1$, $L_2$, $L_3$. FIG. 5B illustrates the heated condition (for example, 60° C.–65° C.) in which "B" lens element 118b has distorted (in exaggerated form) outwardly toward light transmitting or generating element 112. Under typical circumstances, this would change the distance $L_1$ and thereby potentially distort an image being projected through lens assembly 100. In accordance with the invention, however, lens mount 106 is formed of a material, such as aluminum, having a CTE less than the material forming focus mount 102. In this example, focus mount 102 may be formed from a plastic material such as Cycolac KJW available from General Electric Plastics, Pittsfield, Mass., and having a CTE of $11.2 \times 10^{-5}$ cm/cm/C. Aluminum has a CTE of $2.4 \times 10^{-5}$ cm/cm/C. Thus, focus mount 102 will expand from support structure 104 to a length $L_2'$ from its original length $L_2$, as shown in exaggerated form in FIG. 5B. This will carry lens mount 106 to the left as viewed in FIG. 5B such that distance $L_3$ becomes a shorter distance $L_3'$. The result is that the distance between the outer surface of "B" lens element 118b and light transmitting or generating element 112 preferably stays the same or changes only slightly. That is, $L_1$ equals or approximately equals $L_1'$. It will be appreciated that under heated conditions, any movement of lens 118b to the left, as viewed in FIG. 5B, will be beneficial to the ultimate image transmission through lens assembly 100 even if the original $L_1$ distance is not fully achieved.

While the present invention has been illustrated by a description of a preferred embodiment and while this embodiment has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims, wherein

We claim:

1. A lens assembly to be mounted in an environment subject to temperature change, the lens assembly comprising:

a generally tubular lens mount having an interior and an exterior and formed from a material having a first coefficient of thermal expansion, first and second lenses mounted along an axis within said interior of said lens mount, a generally tubular focus mount coupled to said exterior of said lens mount and formed from a material having a second coefficient of thermal expansion different than said first coefficient of thermal expansion, and adjustment and locking structure coupling said lens mount to said focus mount to allow said lens mount to be moved relative to said focus mount along said axis and then locked in position to provide an initial focus position of said first and second lenses, said first and second lenses carried along said axis on one side of said adjustment and locking structure, wherein, after said first and second lenses have been locked in the initial focus position and the lens mount and focus mount are subject to temperature change, the relative axial positions of said lens mount and said focus mount automatically change as a result of the first and second coefficients of thermal expansion to move said first and second lenses together relative to said adjustment and locking structure to a new focus position.

2. The lens assembly of claim 1, wherein said adjustment and locking structure further comprises a fastener assembly with a first portion directly coupled with said lens mount and a second portion extending through and movable along a slot in said focus mount to move the lens mount to the initial focus position and including a locking element securable on an exterior of said focus mount to lock said lens mount at the initial focus position.

3. The lens assembly of claim 1, wherein said adjustment and locking structure further comprises a threaded connection between said lens mount and said focus mount and a locking member on said lens mount and movable between locked and unlocked positions to selectively fix said lens mount at the initial focus position.

4. The lens assembly of claim 1, further comprising a third lens mounted along said axis and including a convex portion which is curved away from said first lens, wherein said convex portion distorts away from said first lens when heated during use and said first and second lenses automatically move toward said third lens as a result of the first and second coefficients of thermal expansion.

5. The lens assembly of claim 1, further comprising a liquid coolant contained therein, said liquid coolant having a refractive index which changes when subject to the temperature change and wherein the new focus position assists in correcting for defocussing which occurs as a result of the change in said refractive index.

6. The lens assembly of claim 1, wherein said first coefficient of thermal expansion is higher than said second coefficient of thermal expansion.

7. The lens assembly of claim 6, wherein said first coefficient of thermal expansion is at least two times higher than said second coefficient of thermal expansion.

8. The lens assembly of claim 1, wherein one of said focus mount and said lens mount is formed from plastic and the other of said focus mount and said lens mount is formed from metal.

9. The lens assembly of claim 1, wherein said focus mount and said lens mount are each formed from plastic.

10. The lens assembly of claim 1, wherein said focus mount and said lens mount are each formed from metal.

11. The lens assembly of claim 1, wherein said lens mount and said focus mount are each generally cylindrical.

12. A projection television lens assembly comprising:

a generally tubular lens mount having an interior and an exterior and formed from a material having a first coefficient of thermal expansion, first and second lenses mounted along an axis within said interior of said lens mount, a third lens mounted along said axis, said third lens adapted for mounting adjacent a light source, a generally tubular locus mount coupled to said exterior of said lens mount and formed from a material having a second coefficient of thermal expansion different than said first coefficient of thermal expansion, and adjustment and locking structure coupling said lens mount to said focus mount, said first and second lenses carried along said axis on one side of said adjustment and locking structure, and said adjustment and locking structure being operative to allow said lens mount to be moved relative to said focus mount along said axis and then locked in position to provide an initial focus position of said first and second lenses relative to said third lens, wherein, after at least said first and second lenses have been locked in the initial focus position and the lens mount, focus mount and third lens are heated by the light source, said lens mount and focus mount automatically move relative to each other to thereby move said first and second lenses together relative to said adjustment and locking structure and to said third lens to a new focus position as a result of the differing first and second coefficients of thermal expansion.

13. The projection television lens assembly of claim 12, wherein said first and second lenses are mounted for movement relative to said third lens along said axis using said adjustment and locking structure, and also upon heating by the light source.

14. The projection television lens assembly of claim 12, wherein said first and second lenses move away from said adjustment and locking structure after said lens mount is heated by the light source.

15. The projection television lens assembly of claim 12, wherein said adjustment and locking structure further comprises a fastener assembly with a first portion directly coupled with said lens mount and a second portion extending through and movable along a slot in said focus mount to move the lens mount to the initial focus position and including a locking element securable on an exterior of said focus mount to lock said lens mount at the initial focus position.

16. The projection television lens assembly of claim 12, wherein said first coefficient of thermal expansion is higher than said second coefficient of thermal expansion.

17. The projection television lens assembly of claim 16, wherein said first coefficient of thermal expansion is at least two times higher than said second coefficient of thermal expansion.

18. The projection television lens assembly of claim 12, wherein one of said focus mount and said lens mount is formed from plastic and the other of said focus mount and said lens mount is formed from metal.

19. The projection television lens assembly of claim 12, wherein said focus mount and said lens mount are each formed from plastic.

20. The projection television lens assembly of claim 12, wherein said focus mount and said lens mount are each formed from metal.

21. The projection television lens assembly of claim 12, wherein said third lens is a plastic field flattener lens.

22. The projection television lens assembly of claim 12, further comprising a liquid coolant contained therein, said liquid coolant having a refractive index which changes when heated by the light source and wherein the new focus position assists in correcting for defocussing which occurs as a result of the change in said refractive index.

23. The projection television lens assembly of claim 12, wherein said third lens includes a convex portion which is curved away from said first lens, wherein said convex portion distorts away from said first lens when heated during use and said first and second lenses automatically move toward said third lens under the effect of the first and second coefficients of thermal expansion.

24. The projection television lens assembly of claim 12, wherein said third lens is formed of a material which undergoes a distortion defocussing effect when heated during use and said first and second lenses automatically move to the new focus position to compensate for the distortion.

25. A method of adjusting the focus of a projection television lens assembly which includes a generally tubular focus mount, a generally tubular lens mount coupled for movement along an axis relative to the focus mount, at least first and second lenses carried by the lens mount along the axis, a third lens mounted along the axis, and adjustment and locking structure coupling the lens mount to the focus mount, the first and second lenses carried along the axis on one side of the adjustment and locking structure, and the lens mount and focus mount formed from materials having different coefficients of thermal expansion, the method comprising:

moving the focus mount and lens mount relative to one another along the axis to adjust the axial position of the first and second lenses into an initial focus position relative to the third lens, heating the focus mount and the lens mount with a light source, and automatically adjusting the position of the lens mount and the first and second lenses along the axis to a new focus position by thermally expanding at least one of the lens mount and the focus mount relative to the other using heat generated by the light source, the first and second lenses moving together along the axis relative to the adjustment and locking structure and to the third lens.

26. The method of 25, wherein automatically adjusting the axial position of the lens mount and the first and second lenses further comprises:

thermally expanding the focus mount to a greater extent than the lens mount.

27. The projection television lens assembly of claim 1, wherein said first coefficient of thermal expansion is lower than said second coefficient of thermal expansion.

28. The projection television lens assembly of claim 12, wherein said third lens is carried by said focus mount.

29. The projection television lens assembly of claim 12, wherein said first coefficient of thermal expansion is lower than said second coefficient of thermal expansion.

30. The projection television lens assembly of claim 12, wherein said first and second lenses are carried along the axis between said adjustment and locking structure and said third lens so that said first and second lenses move toward said third lens as said lens mount and focus mount automatically move relative to each other.

31. The method of claim 25, wherein automatically adjusting the axial position of the lens mount and the first and second lenses further comprises:

thermally expanding the lens mount to a greater extent than the focus mount.

32. The method of claim 25, wherein automatically adjusting the axial position of the lens mount and the first lens further comprises:

moving the first and second lenses together along the axis toward the third lens.

* * * * *

UNITED STATES PATENT AND TRADEMARK OFFICE
CERTIFICATE OF CORRECTION

PATENT NO. : 6,603,614 B2  Page 1 of 1
DATED : August 5, 2003
INVENTOR(S) : Fulkerson E. Gregory It is certified that error appears in the above-identified patent and that said Letters Patent is hereby corrected as shown below:

<u>Column 8,</u>
Line 2, delete "locus" and insert -- focus --.

Signed and Sealed this

Sixteenth Day of December, 2003

JAMES E. ROGAN
*Director of the United States Patent and Trademark Office*